US008393533B2

(12) United States Patent
Yamada

(10) Patent No.: US 8,393,533 B2
(45) Date of Patent: Mar. 12, 2013

(54) AUTOMATIC TRANSACTION PROCESSING APPARATUS

(75) Inventor: Kyoichi Yamada, Gunma (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 90 days.

(21) Appl. No.: 13/061,757

(22) PCT Filed: Nov. 18, 2009

(86) PCT No.: PCT/JP2009/069544

§ 371 (c)(1), (2), (4) Date: Mar. 2, 2011

(87) PCT Pub. No.: WO2010/067694

PCT Pub. Date: Jun. 17, 2010

(65) Prior Publication Data

US 2011/0163644 A1 Jul. 7, 2011

(30) Foreign Application Priority Data

Dec. 10, 2008 (JP) ................................ 2008-314054

(51) Int. Cl.
*G06F 17/60* (2006.01)

(52) U.S. Cl. ....................................... 235/379; 235/381

(58) Field of Classification Search .................. 235/379, 235/381, 380, 483

See application file for complete search history.

(56) References Cited

U.S. PATENT DOCUMENTS

| | | | | |
|---|---|---|---|---|
| 7,043,844 | B2 * | 5/2006 | Lin | 30/298.4 |
| 7,044,367 | B2 * | 5/2006 | Fockler | 235/379 |
| 8,181,855 | B2 * | 5/2012 | Douglass et al. | 235/379 |
| 8,191,768 | B1 * | 6/2012 | Ryan et al. | 235/379 |

FOREIGN PATENT DOCUMENTS

| | | |
|---|---|---|
| JP | 03-185590 A | 8/1991 |
| JP | 2000-268229 A | 9/2000 |

* cited by examiner

*Primary Examiner* — Daniel St. Cyr

(74) *Attorney, Agent, or Firm* — Rabin & Berdo, P.C.

(57) ABSTRACT

In an automatic ticketing apparatus in which a customer-operated display screen (2) operated by a customer also serves as a maintenance display screen, the customer-operated display screen (2) is configured to be linearly movable while maintaining the direction of the display surface in the same direction, and by moving the customer-operated display screen, a maintenance space (15), through which the interior of the apparatus can be accessed, is opened. Furthermore, a lower operation unit (4) that is movable in a direction different from the movement direction of the customer-operated display screen (2) is provided, and the lower operation unit (4) is configured such that the maintenance space (15), through which the interior of the apparatus can be accessed, is enlarged by moving the lower operation unit (4). Accordingly, an operator can perform a maintenance operation easily while checking the display content of the customer-operated display screen.

11 Claims, 5 Drawing Sheets

AUTOMATIC TRANSACTION PROCESSING APPARATUS

TECHNICAL FIELD

The present invention relates to an automatic transaction processing apparatus including an automatic ticketing apparatus that automatically performs a ticketing procedure such as boarding ticket issuance at an airport or a railway ticket issuance at a station.

BACKGROUND ART

Generally, in a ticketing procedure of a boarding ticket, a railroad pass, or the like, customer-operated automatic ticketing apparatuses that issue a boarding ticket, a railroad pass, and the like (hereinafter, referred to as a boarding ticket) in accordance with the operation of a customer are known. The automatic ticketing apparatus includes a customer-operated display screen that has a touch panel function used for a customer to perform an input operation and further includes a card inserting opening into which various cards are inserted and a boarding ticket discharging port that discharges a boarding ticket, and the like. In such an apparatus, a ticketing process is completed by a customer's operation without an intervention of an operator. Accordingly, fault recovery of the apparatus and maintenance work for internal checking of a medium are constantly required.

FIG. 5 is an explanatory diagram illustrating a maintenance operation of a conventional automatic ticketing apparatus. The automatic ticketing apparatus 51 includes a customer-operated display screen 52, an upper operation unit 53 that occupies an upper half portion of the front side of the apparatus, plural insertion openings and discharge openings, and a lower operation unit 54 that occupies a lower half portion of the front side of the apparatus. Inside the automatic ticketing apparatus 51, internal units such as a circuit board on which electric components used for controlling the apparatus are mounted, a roll paper medium for boarding tickets, and a card reader/writer are included. The upper operation unit 53 can be rotated around the upper end side serving as its rotation axis as shown in FIG. 5. As the upper operation unit 53 is lifted in a direction denoted by arrow C, a maintenance space in which a maintenance staff can access the internal units is opened. The upper operation unit 53 is normally closed and is locked with the main body of the automatic ticketing apparatus 51.

In order to perform a maintenance operation, a maintenance staff rotates a cylinder lock 55 so as to release locking by operating a lock releasing key disposed in the lower operation unit 54. Accordingly, the maintenance staff can perform maintenance of the internal units using the maintenance space opened by lifting the upper operation unit 53.

Japanese Patent Application Laid-Open (JP-A) No. 2000-268229 discloses a technology, in a transaction processing apparatus having a customer transaction screen on a front panel of an apparatus, for arranging the customer transaction screen at a position appropriate for an operation by a maintenance staff by lifting up the front panel and turning back only the customer transaction screen at the time of the maintenance operation.

DISCLOSURE OF INVENTION

Problem to be Solved by the Invention

However, when maintenance of the conventional automatic ticketing apparatus 51 shown in FIG. 5 is performed, the maintenance is performed by displaying the content of maintenance on the customer-operated display screen 52. In other words, the customer operated-display screen 52 also serves as a display screen for maintenance. Accordingly, when a maintenance staff lifts up the customer-operated display screen 52, the customer-operated display screen 52 is reversed, and the maintenance staff cannot directly check the display content of the customer-operated display screen 52. Thus, in order to perform a maintenance operation while checking the display content, the maintenance staff frequently needs to raise and lower the customer-operated display screen 52, and the operation is burdensome.

The configuration disclosed in JP-A No. 2000-268229 described above may be considered. However, the configuration will be complicated in order to realize pulling down only the customer transaction screen reversely after lifting the front panel.

The problem to be solved by the present invention is to provide an automatic ticketing apparatus in which a customer-operated display screen operated by a customer serves also as a maintenance display screen, and that allows a maintenance staff to easily perform a maintenance operation while checking the display content of a display screen of the customer-operated display screen and has a simple structure.

Means for Solving the Problem

In order to solve the above-described problem, the present invention provides an automatic transaction processing apparatus in which a customer-operated display screen operated by a customer serves also as a maintenance display screen, in which the customer-operated display screen is disposed so as to be linearly movable, and a maintenance space, through which the inside of the apparatus can be accessed, is opened by moving the customer-operated display screen.

Effect of Invention

According to the present invention, an automatic ticketing apparatus, in which a customer-operated display screen operated by a customer serves also as a maintenance display screen, can be provided which allows a maintenance staff to easily perform a maintenance operation while checking the display content, and having a simple structure.

BEST MODE FOR IMPLEMENTING THE INVENTION

First Embodiment

Figure 2:
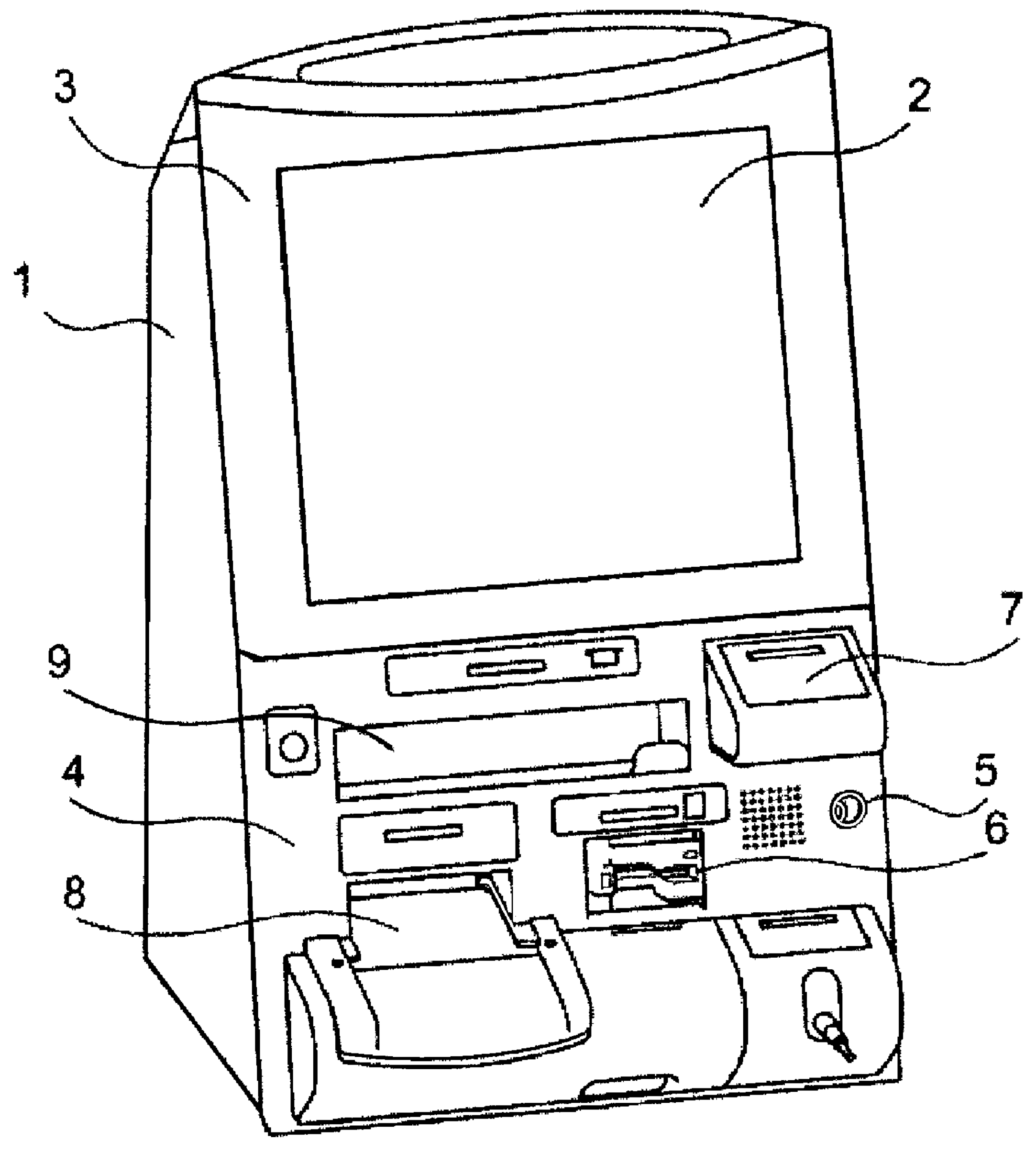
FIG. 2 is an outer appearance view of an automatic ticketing apparatus according to the first embodiment.

Hereinafter, a first embodiment will be described with reference to drawings. FIG. 2 is an outer appearance view of an automatic ticketing apparatus 1 according to the first embodiment. The automatic ticketing apparatus 1 is a customer-operated type automatic ticketing apparatus that is installed at an airport or the like and issues a boarding ticket through a user's operation. The automatic ticketing apparatus 1 has, on the front side of the apparatus, an upper operation unit 3 that occupies an upper half portion of the front side of the apparatus and a lower operation unit 4 that occupies a lower half portion of the front side of the apparatus. The upper operation unit 3 includes a customer-operated display screen 2 that performs display guidance used in a ticketing process for a customer and has a touch panel function so as to enable the customer to perform an input operation in accordance with the display guidance. The customer-operated display screen 2 is a liquid crystal display.

The lower operation unit 4 has a magnetic card inserting opening 6 that accepts a magnetic card held by a customer for issuing a boarding ticket and an antenna unit 7 that accepts a non-contact type card held by a customer for issuing a boarding ticket as well. Furthermore, the lower operation unit 4 has a document inserting opening 8 that accepts input of a document in a case in which a document such as a passport or a visa is required, and a boarding pass discharging opening 9 that discharges an issued boarding pass. In addition, as described below, a cylinder lock 5 into which a lock releasing key for maintenance is inserted is also disposed in the lower operation unit 4.

Further, as described below, internal units such as a module such as a circuit substrate 11 on which electric components controlling the apparatus are mounted, a roll paper medium 21 for boarding tickets, and a card reader/writer not shown in the figure are included inside the automatic ticketing apparatus 1.

In order to receive a boarding ticket by operating the automatic ticketing apparatus 1, a customer firstly operates the customer-operated display screen 2. Thereafter, the customer inserts a magnetic card into the above-described magnetic card inserting opening 6 or holds a non-contact card over the antenna unit 7. Thereafter, by performing a predetermined procedure, the customer receives a boarding ticket that is discharged from the boarding ticket discharging opening 9.

Figure 1:
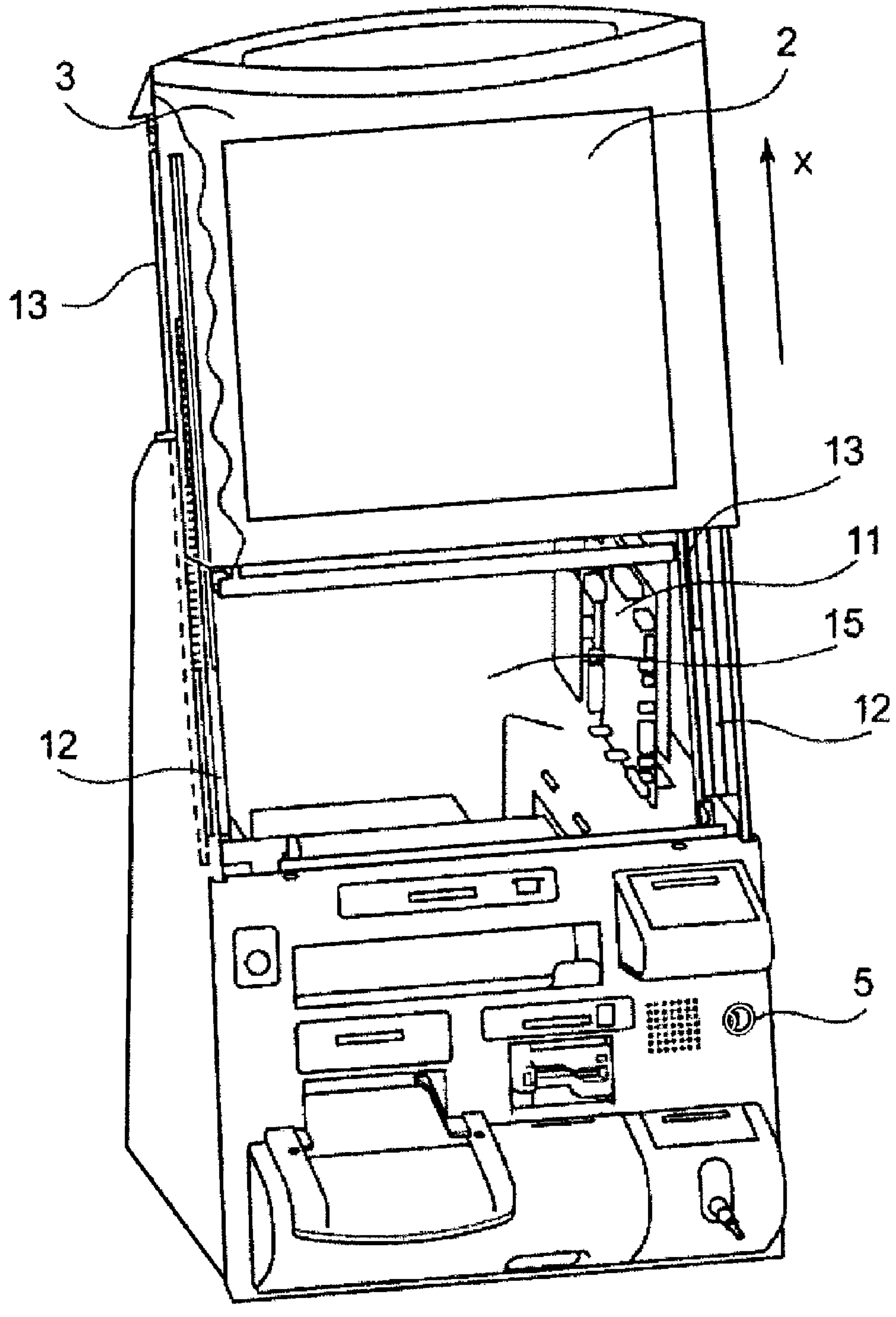
FIG. 1 is an explanatory diagram illustrating a maintenance operation of an automatic ticketing apparatus according to a first embodiment.

FIG. 1 is an explanatory diagram illustrating a maintenance operation of the automatic ticketing apparatus 1. The upper operation unit 3 can be vertically moved together with the customer-operated display screen 2 by unlocking the cylinder lock 5. After the upper operation unit 3 is moved, a maintenance space 15 is open. The upper operation unit 3 can be linearly moved from the front side of the automatic ticketing apparatus 1 to the upper side as denoted by arrow X shown in FIG. 1. The movement mechanism thereof is slide rails 12 disposed on both sides. That is, the automatic ticketing apparatus 1 has main body-side rails at both sides thereof, the upper operation unit 3 has movement-side rails, and these rails are connected together with wheels such as bearings. Furthermore, a gas spring 13 is disposed in the slide rail 12. By fixing the cylinder unit of the gas spring 13 to the upper operation unit 3, and fixing the front end of the piston loading unit to the automatic ticketing apparatus 1, the upper operation unit 3 can be smoothly moved vertically.

In order to the maintenance of the automatic ticketing apparatus 1, a maintenance staff firstly rotates the cylinder lock 5 so as to release the locking by operating a lock releasing key for maintenance. Then, the upper operation unit 3 is lifted to the upper side (in the direction of arrow X) due to an urging force of the gas spring 13. Then, the upper operation unit 3 stops at a predetermined position. Thereafter, the maintenance staff may perform a maintenance operation by accessing the circuit substrate 11 or the like disposed inside the automatic ticketing apparatus 1 by using the maintenance space 15 that is open at the automatic ticketing apparatus 1. Further, since the customer-operated display screen 2 is linearly moved to the upper side, the display screen of the customer-operated display screen 2 is maintained in the same direction as is. Since the customer-operated display screen 2 also serves as a maintenance display screen, the maintenance staff can perform a maintenance operation while viewing the customer-operated display screen 2.

As described above, according to the first embodiment of the present invention, in the automatic ticketing apparatus in which the customer-operated display screen that is operated by a customer also serves as a maintenance display screen, the display surface of the customer-operated display screen is maintained in the same direction as is, in other words, the customer-operated display screen is provided so as to be linearly movable, a maintenance staff can perform a maintenance operation easily while checking the display content of the customer-operated display screen. In addition, since the rotation of the customer-operated display screen that is conventionally needed is not necessary, a maintenance operation area can be minimized, and accordingly, an automatic ticketing apparatus having a simple structure can be provided. Furthermore, while the movement direction of the center of gravity of the customer-operated display screen due to the movement is conventionally in the horizontal direction, according to the present embodiment, the movement direction of the center of gravity is in the vertical direction, and an automatic ticketing apparatus having a stable center of gravity can be provided.

Second Embodiment

Figure 3:
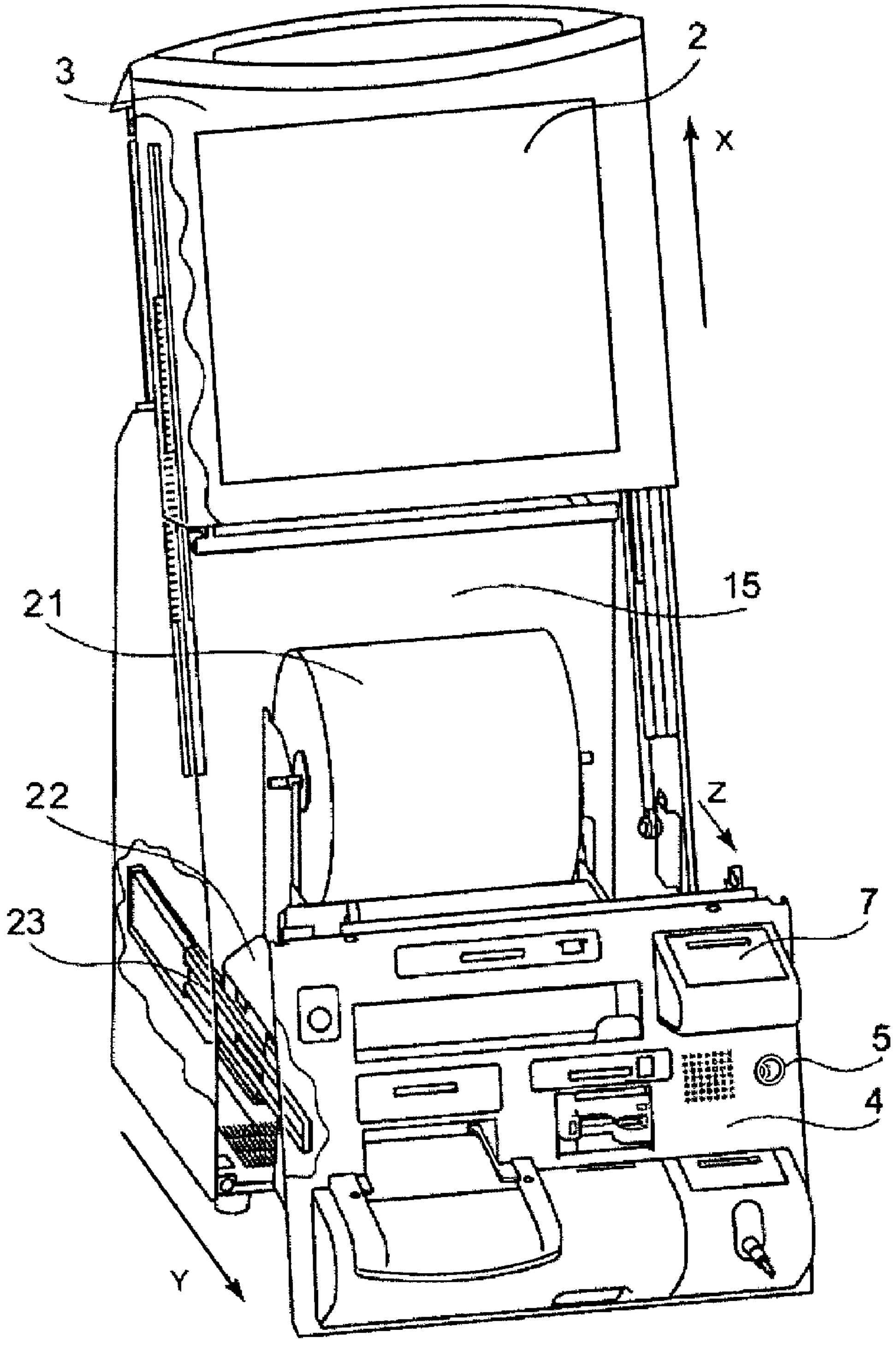
FIG. 3 is an explanatory diagram illustrating a maintenance operation of an automatic ticketing apparatus according to a second embodiment.

Next, a second embodiment will be described. The same components as those of the first embodiment are denoted by the same reference numerals. FIG. 3 is an explanatory diagram illustrating a maintenance operation of an automatic ticketing apparatus 1 according to the second embodiment. The upper operation unit 3 can be vertically moved together with the customer-operated display screen 2 by unlocking the cylinder lock 5. After the upper operation unit 3 is moved, the maintenance space 15 is opened. Regarding the movement direction of the upper operation unit 3 the upper operation unit 3 can be linearly moved to the upper side from the front side of the automatic ticketing apparatus 1 as denoted by arrow X in the figure. The movement mechanism is the same as that of the first embodiment.

The lower operation unit 4 can also be moved by unlocking the cylinder lock 5. Regarding the movement direction of the lower operation unit 4, the lower operation unit 4 can be moved in a direction different from the movement direction of the customer-operated display screen 2, that is, as denoted by arrow Y shown in the figure, the lower operation unit 4 can be forwardly moved from the front side of the automatic issuing apparatus 1. Inside the lower operation unit 4, a ticketing printer frame 22 that is integrally moved with the lower operation unit 4 and a roll paper medium 21 that is supported by the ticketing printer frame 22, and the like are disposed.

When the lower operation unit 4 is moved, the maintenance space 15 is open more widely. Accordingly, the roll paper medium 21 can be exchanged. The movement of the lower operation unit 4 is achieved by slide rails 23 disposed on both sides. That is, the automatic ticketing apparatus 1 have main body-side rails at its both sides, and the lower operation unit 4 has movement-side rails, and the rails are connected together with wheels such as bearings.

The maintenance staff may rotate the cylinder lock 5 so as to release the locking by operating a lock releasing key for maintenance and, as described above, after the upper operation unit 3 is moved to the upper side, may draw the lower operation unit 4 forward manually. Then, the maintenance staff may perform a maintenance operation by removing an old roll paper medium 21 disposed inside the automatic ticketing apparatus 1 and replacing it with a new roll paper medium 21 by using the maintenance space 15 that is open in the automatic ticketing apparatus 1. The display surface of the customer-operated display screen 2 is maintained in the same direction as is. Since the customer-operated display screen 2 also serves as a maintenance display screen, the maintenance staff may perform a maintenance operation while viewing the customer-operated display screen 2.

Figure 4:
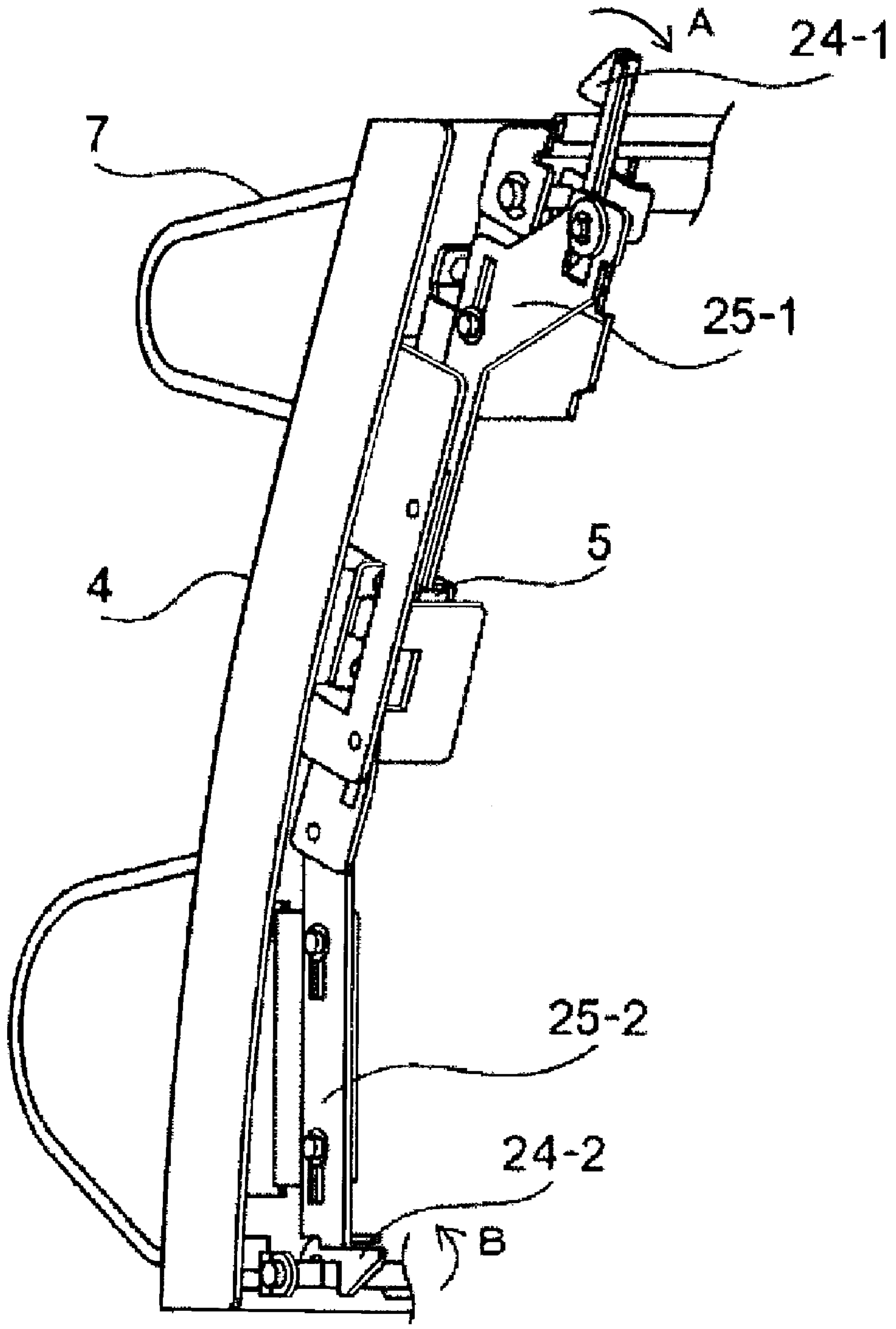
FIG. 4 is an explanatory diagram illustrating a lock opening mechanism of a cylinder lock.
Figure 5:
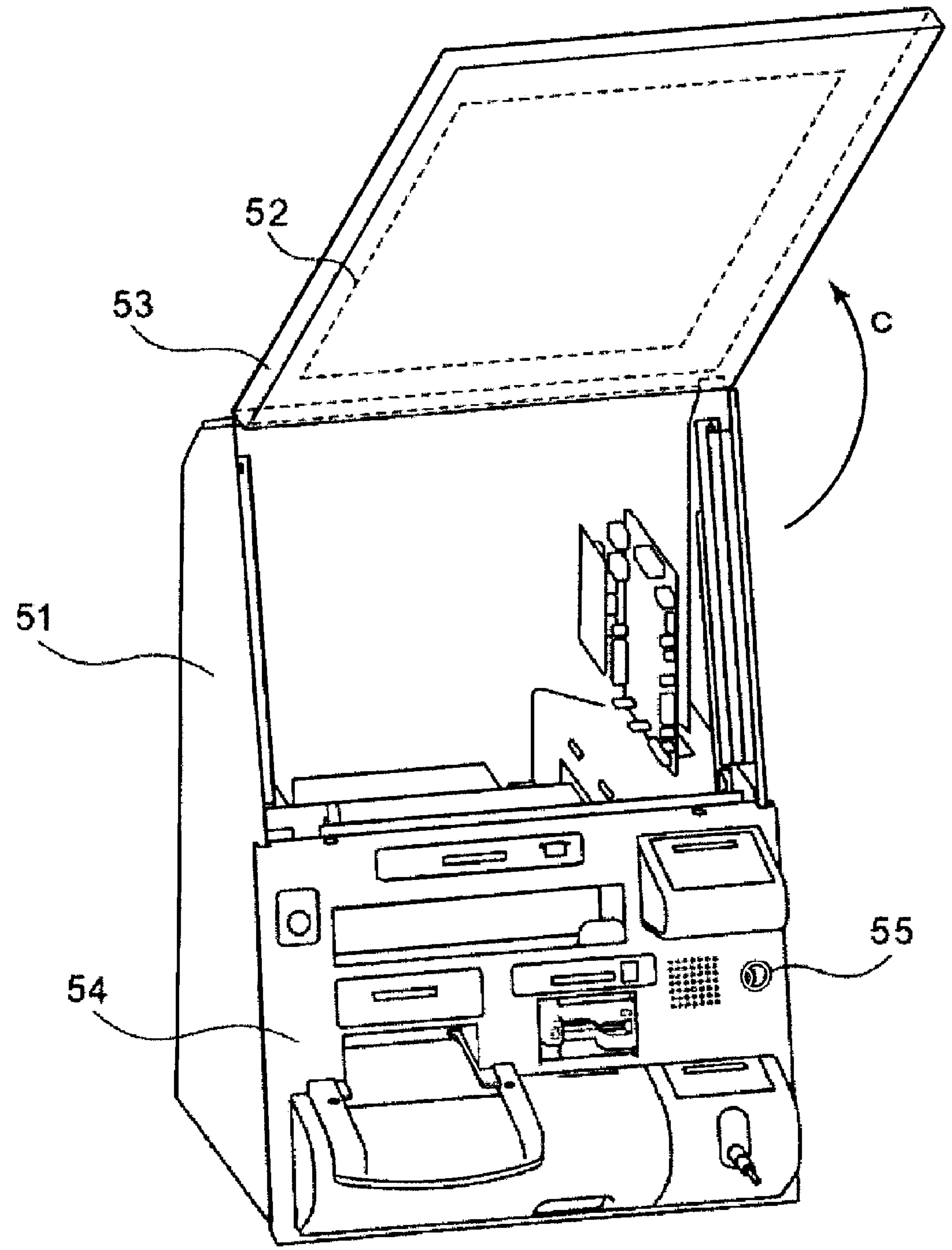
FIG.5 RELATED ART
FIG. 5 is an explanatory diagram illustrating a maintenance operation of a conventional automatic ticketing apparatus.

FIG. 4 is an explanatory diagram illustrating a lock opening mechanism of the cylinder lock 5. FIG. 4 illustrates a state of the cylinder lock 5 being seen from the direction of arrow Z shown in FIG. 3. A lock releasing mechanism of the cylinder lock 5 is disposed on the rear surface of the lower operation unit 4. At the time of being locked, a lock lever 24-1 is locked into a lock portion that is provided in the upper operation unit 3 which is not shown in the figure. Further, at the time of being locked, a lock lever 24-2 is locked into a lock portion that is provided in the main body of the automatic ticketing apparatus 1 which is not shown in the figure.

When the maintenance staff rotates the cylinder lock 5 by operating the lock releasing key for maintenance, the rotation force is applied to a link 25-1 so as to move the lock lever 24-1 in a release direction (arrow A shown in FIG. 4). Accordingly, the upper operation unit 3 is disengaged from locking and can be moved away from the lower operation unit 4. Simultaneously, the rotation force of the cylinder link 5 is also applied to the link 25-2 and moves the lock lever 24-2 in a release direction (arrow B shown in FIG. 4). Accordingly, the lower operation unit 4 is disengaged from locking and can be moved away from the main body of the automatic ticketing apparatus 1.

According to the second embodiment of the present invention, the customer-operated display screen 2 is provided such that the maintenance space, through which the inside of the apparatus can be accessed, is opened by moving the customer-operated display screen 2, and simultaneously, the lower operation unit 4 that can be moved in a direction different from the movement direction of the customer-operated display screen 2 is provided. The lower operation unit 4 is configured such that the maintenance space 15 is enlarged by moving the lower operation unit 4. Accordingly, whether either or both of the display screen 2 and the lower operation unit 4 are moved and the movement order can be determined in accordance with the type of the maintenance operation to be performed. That is, for example, in the case of exchange of the roll paper medium 21, the customer-operated display screen 2 and the lower operation unit 4 are moved, but, in the case of only the maintenance of the circuit substrate 11, only the customer-operated display screen 2 may be moved and the movement of the lower operation unit 4 is not necessary.

Further, according to the second embodiment, similarly to the first embodiment, since the display surface of the customer-operated display screen is maintained in the same direction as is, in other words, since the customer-operated display screen is configured so as to be linearly movable, a maintenance staff can perform a maintenance operation easily while checking the display content of the customer-operated display screen. In addition, since the rotation of the customer-operated display screen that is conventionally needed is not required, the maintenance operating area can be minimized, and accordingly, the automatic ticketing apparatus having a simple structure can be provided.

The invention claimed is:

1. An automatic transaction processing apparatus comprising:

an upper operation unit including a customer-operated display screen that is operated by a customer and that serves as a maintenance display screen; and a cylinder lock;

wherein the customer-operated display screen is configured to be linearly movable so that a maintenance space, through which an interior of the apparatus can be accessed, is opened by moving the customer-operated display screen; and wherein the upper operation unit including the customer-operated display screen moves based on a rotation of the cylinder lock.

2. The automatic transaction processing apparatus according to claim 1, wherein being linearly movable is being movable in a state in which a direction of the customer-operated display screen is maintained in the same direction.

3. The automatic transaction processing apparatus according to claim 2, wherein the customer-operated display screen comprises a display screen for performing a ticketing process for the customer.

4. The automatic transaction processing apparatus according to claim 1, wherein the customer-operated display screen is vertically movable.

5. The automatic transaction processing apparatus according to claim 4, wherein the customer-operated display screen comprises a display screen for performing a ticketing process for the customer.

6. The automatic transaction processing apparatus according to claim 1, further comprising a gas spring that supports the customer-operated display screen.

7. The automatic transaction processing apparatus according to claim 6, wherein the customer-operated display screen comprises a display screen for performing a ticketing process for the customer.

8. The automatic transaction processing apparatus according to claim 1, further comprising:

an additional customer operation unit that is movable in a direction different from the movement direction of the customer-operated display screen;

wherein the additional customer operation unit is configured so that the maintenance space, through which the interior of the apparatus can be accessed, is enlarged by moving the additional customer operation unit.

9. The automatic transaction processing apparatus according to claim 8, wherein the customer-operated display screen comprises a display screen for performing a ticketing process for the customer.

10. The automatic transaction processing apparatus according to claim 1, wherein the customer-operated display screen comprises a display screen for performing a ticketing process for the customer.

11. The automatic transaction processing apparatus according to claim 1, wherein a direction of the customer-operated display screen, after movement, is maintained in a direction such that the customer-operated display screen is viewable by an operator while accessing the interior of the apparatus.

* * * * *